(12) United States Patent
Adams et al.

(10) Patent No.: US 8,786,620 B2
(45) Date of Patent: Jul. 22, 2014

(54) DISCARDING IDLE GRAPHICAL DISPLAY COMPONENTS FROM MEMORY AND PROCESSING

(75) Inventors: Tyler Robert Adams, Kirkland, WA (US); Michael Ivan Borysenko, Redmond, WA (US); Warren Leung, Bellevue, WA (US); Barry Christopher Allyn, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/295,611

(22) Filed: Nov. 14, 2011

(65) Prior Publication Data

US 2013/0120402 A1    May 16, 2013

(51) Int. Cl.
G06F 12/02    (2006.01)
G06F 9/44    (2006.01)

(52) U.S. Cl.
CPC .............. *G06F 9/44* (2013.01); *Y02B 60/1235* (2013.01); *Y02B 60/1228* (2013.01)
USPC ......................................................... 345/543

(58) Field of Classification Search
None
See application file for complete search history.

(56) References Cited

U.S. PATENT DOCUMENTS

| | | | | |
|---|---|---|---|---|
| 5,864,336 | A | * | 1/1999 | Yano .............................. 713/321 |
| 5,977,966 | A | * | 11/1999 | Bogdan .......................... 715/800 |
| 7,168,048 | B1 | | 1/2007 | Goossen et al. |
| 7,302,648 | B1 | | 11/2007 | Brunner et al. |
| 7,703,036 | B2 | | 4/2010 | Satterfield et al. |
| 2003/0134632 | A1 | | 7/2003 | Loughran |
| 2006/0274070 | A1 | | 12/2006 | Herman et al. |
| 2006/0274080 | A1 | | 12/2006 | Lee et al. |
| 2007/0233377 | A1 | | 10/2007 | Salay et al. |
| 2008/0001968 | A1 | | 1/2008 | Krueger |
| 2008/0100636 | A1 | * | 5/2008 | Lai et al. ........................ 345/546 |
| 2008/0270625 | A1 | * | 10/2008 | Chaturvedi et al. ............ 709/234 |
| 2010/0164968 | A1 | * | 7/2010 | Kwa et al. ...................... 345/545 |
| 2010/0171759 | A1 | | 7/2010 | Nickolov et al. |
| 2011/0001753 | A1 | | 1/2011 | Frej et al. |
| 2011/0214079 | A1 | | 9/2011 | Young |
| 2012/0288139 | A1 | * | 11/2012 | Singhar ......................... 382/103 |
| 2013/0162664 | A1 | * | 6/2013 | Peacock et al. ................ 345/543 |

OTHER PUBLICATIONS

"WPF Interoperation: "Airspace" and Window Regions Overview", Retrieved on: Sep. 14, 2011, http://msdn.microsoft.com/en-us/library/aa970688%28VS.90%29.aspx, 4 pages.
Alexa, et al., "An Animation System for User Interface Agents", In Proceedings of WSCG, Feb. 5-9, 2001, pp. 154-160.

(Continued)

*Primary Examiner* — Maurice L McDowell, Jr.
*Assistant Examiner* — Donna J Ricks
(74) *Attorney, Agent, or Firm* — Steve Crocker; Jim Ross; Micky Minhas

(57) ABSTRACT

Memory storage and processing for idle computer-generated graphical display components are discarded for conserving memory capacity, processing resources and power consumption. If a computer-generated display frame goes idle for a prescribed duration, for example, 30 seconds, wherein no user action or processor action is performed on the idle display frame, stored data representing the idle display frame is discarded from memory and processing for the idle display component is ceased, thus conserving memory space, processing resources and power consumption (e.g., battery power). If the discarded display frame becomes active again, its discarded resources may be recreated. Alternatively, an idle display component may be passed to a separate application and may be reclaimed by a requiring application when the idle display component becomes active again.

23 Claims, 11 Drawing Sheets

(56) References Cited

OTHER PUBLICATIONS

"Step by Step Tutorials for Microsoft Word 2002 Accessibility Options", Retrieved on: Sep. 14, 2011, http://download.microsoft.com/download/b/d/5/bd515214-0728-4a54-9625-ab3f198cf448/Word2002.doc, 59 pages.

"Performance Considerations in Applications for Windows Phone", Retrieved on: Sep. 12, 2011, http://msdn.microsoft.com/en-us/library/ff967560(v=vs.92).aspx, 23 pages.

Euh, et al., "A Low-Power Content-Adaptive Texture Mapping Architecture for Real-Time 3D Graphics", In Proceedings of the 2nd International Conference on Power-aware Computer Systems, 2002, 11 pages.

* cited by examiner

DISCARDING IDLE GRAPHICAL DISPLAY COMPONENTS FROM MEMORY AND PROCESSING

BACKGROUND

With the advent of computing, user interfaces have been developed for allowing users to interact with electronic content and underlying software application functionality. In some cases, a given user may deploy numerous user interfaces associated with numerous content items in layers of deployed user interfaces. For example, a user may have two word processing documents, a spreadsheet document, a slide presentation application document, and an electronic mail interface deployed and displayed on his/her computer display screen simultaneously where each of the displayed documents or content items are layered on the display screen or are displayed adjacent to each other if sufficient display screen space is available or where one or more documents or content items are minimized out of view. In such situations, one of the displayed documents or content items may be an active item because it is currently receiving user action (e.g., editing, cursor focus, etc.) or because it is receiving some type of system action required for updating some aspect of the displayed item. Other displayed content items, for example, a displayed word processing document, may be inactive or idle meaning that no processing or updates are presently needed for that content item owing to an absence of user action or system action on the content item.

In a typical case, each displayed content item may be displayed as a collection of graphical display component presentations, for example, bitmaps, making up the displayed content item. For example, a displayed word processing document may include a collection of displayed bitmaps or other graphical presentations representing functionality buttons/controls (e.g., print buttons, save buttons, and the like), as well as, a collection of displayed bitmaps or other graphical representations representing document content (e.g., text, images, etc.). When such a document or individual graphical display components of the document is/are inactive or idle, continued processing associated with displaying the graphical presentations and continued storage of data for the graphical representations requires significant use of memory capacity, processing resources, and power, including battery life for mobile computing devices. Thus, the storage and processing of idle graphical presentations of electronic content items is costly in terms of memory capacity, processing resources, and power consumption.

It is with respect to these and other considerations that the present invention has been made.

SUMMARY

Embodiments of the present invention solve the above and other problems by discarding memory storage and processing for idle computer-generated graphical display components for conserving memory capacity, processing resources and power consumption.

User interfaces containing functional components (e.g., buttons, controls, document display areas, etc.) and user content (e.g., documents, images, photographs, etc.) may be made up of one or more display frames or windows. Each display frame or window may contain one or more of such components. For example, a word processing application user interface (UI) may contain one display frame or window having a number of buttons that make up a tool bar. Another display frame or window may include search functions and help content that make up a service pane. Yet another display frame or window may include user information such as documents, charts, images, photographs, etc.

According to embodiments, each display frame or window and the display components contained therein may be managed by a display management component (also referred to herein as a "layer host"). That is, the layer host may manage the display components contained in each display frame or window that get drawn to a display screen. A given display component may be shared across multiple display frames or windows and thus may be referenced by multiple layer hosts. A layer host may be assigned to each of the multiple display frames or windows for managing the display components contained therein. If all the multiple display frames or windows are currently active, then all associated layer hosts will be designated as active.

Each display component is assigned a reference count equal to the total number of active layer hosts that references it. If a given display frame or window becomes idle for a prescribed duration, for example, 30 seconds, during which no user or processor action is performed on the display frame or window, then the layer host assigned to that display frame or window will go idle, and the reference count of any display components it references will be decremented by one (1). As long as a display component has a reference count of one or more, storage and processing associated with the display component is maintained. However, if the reference count for any display component is decremented to zero (0), then the data representing the display component is discarded from memory and processing required for maintaining (updating) the display component is terminated until the display component is needed again.

According to other embodiments, in order to conserve processing resources required for creating individual display components, single large display component or texture groups (also referred to herein as "atlases") may be created for storing multiple individual display components or textures. The use of atlases or display component groups is not tied to specific portions of user interfaces. A display component for any portion of a user interface may be stored in an atlas which reduces the time to create each display component. That is, display component groups or atlases may contain display components for very different portions of UI, and different portions of UI may be managed by different display component managers or layer hosts.

For conserving memory and processing resources, both individual display components and display component groups (atlases) may be discarded under prescribed idle states. Discarding display component groups or atlases requires removal of the display components from the group or atlas either by deleting them or by moving them to another group or atlas. Deleting a display component requires all display component managers or layer hosts that reference the display component to go idle. After display components are discarded, display component groups or atlases may be compacted or combined in order to move display components from multiple groups into one group which may create empty groups (atlases) that may then be discarded.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1A:
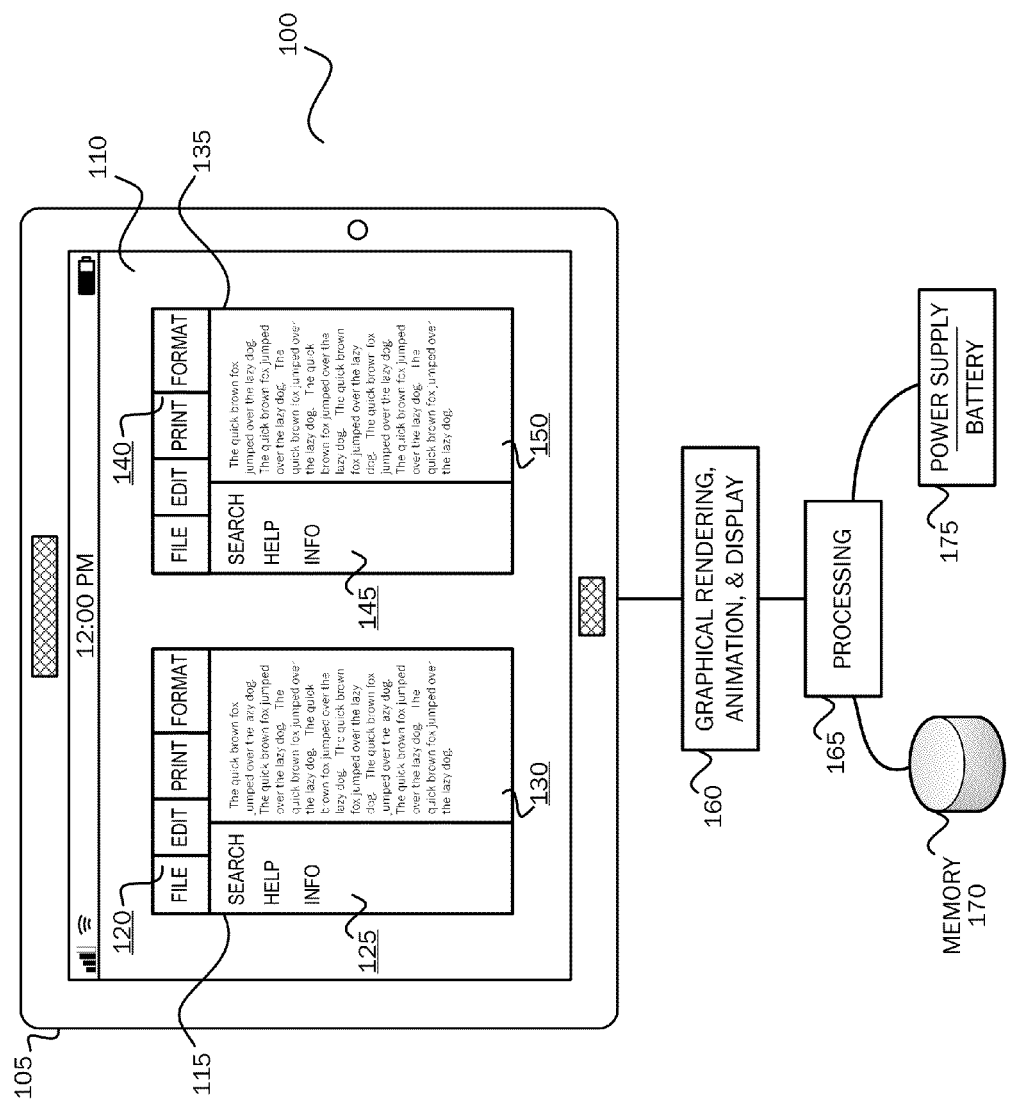
FIG. 1A illustrates a system architecture for discarding memory storage and processing for idle computer-generated graphical display components for conserving memory capacity, processing resources and power consumption.

As briefly described above, embodiments of the present invention are directed to discarding memory storage and processing for idle computer-generated graphical display components for conserving memory capacity, processing resources and power consumption. The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

According to embodiments, when a given graphical display item (e.g., a graphical user interface) is displayed to a computer-enabled display screen, individual display components are generated and stored prior to display on a computer-enabled display screen. In some cases, when display components are displayed on a computer display screen, each individual display component is displayed as a bitmap, image, or other graphical display object for representing the underlying data or functionality associated with the displayed item. For example, if a word processing software application user interface is launched for displaying a document containing text and images for editing by a user, the components of the user interface, for example, functionality buttons and controls, service panes, tool bars, search interfaces, and the like, and user data, for example, text, images, etc. may be displayed on the display screen as a collection of display components representing the underlying software application functionality or user data.

Each of the components may be displayed on the display screen as individual bitmaps, images, or other graphical representations which when grouped together in a display frame or window provides the desired display of a software application user interface and desired user data or other information. According to prior systems, each of the individual graphical display components (sometimes referred to herein as "textures") is continually maintained in memory and is continually processed for display on the computer display screen. Such continual memory maintenance and processing consumes memory space, processing resources and electrical power and/or battery life.

According to embodiments of the invention, when a graphical display component is inactive or idle for a prescribed duration, for example, 30 seconds, the display of the graphical component is maintained on the computer display screen, but processing of the graphical display component is ceased and storage of data representing the graphical display component is discarded from memory. According to one embodiment, user and/or system activity on the display component is tracked by applying a timer to the display component to track user activity (e.g., focus, selection or edit, etc.) or system activity (e.g., automatic update, animation, etc.) on the display component to determine a duration between activities on the display component. The duration after a last user or system activity on the display component in which no user or system activity is received for the display component is compared with the prescribed duration to determine if the prescribed duration (e.g., 30 seconds) is met. Thus, memory capacity, processing resources and required electrical power (including battery life) are conserved for other uses.

If the displayed graphical display component becomes active again, as described below, then the graphical display component may be newly generated and drawn to the display screen, and data representing the updated graphical display component may be stored to memory. However, during the idle time when processing is ceased and data representing the idle graphical display component is discarded from memory, a savings of memory capacity, processing time and power consumption is enjoyed.

In some cases, processing and memory storage for one or more graphical components may not be discarded even if a prescribed idle time is experienced. For example, if one or more graphical components comprise a presently active display frame or window, for example, a top level display frame or window in which user focus is presently placed, such a display frame or window may be maintained in memory and updating processing may continue. For another example, a display animation may be designated as an "immortal" animation meaning that associated memory storage and processing will not be discarded even if a prescribed idle duration is experienced. For example, an animation may be running in a given display frame or window or over a given display component indicating that processing is ongoing (e.g., a spinning circle, a vibrating hour glass, a dancing icon, etc.). Display processing and memory storage for such a display component may be maintained regardless of idle time because the continuing update of the display component is considered otherwise important for user experience and/or information.

FIG. 1A illustrates a system architecture for discarding memory storage and processing for idle computer-generated graphical display components for conserving memory capacity, processing resources and power consumption. The system 100 includes a computer display screen 105 having a computer display screen surface 110 for displaying one or more graphical display components associated with user content and/or software application user interface presentations. According to embodiments, the computer display screen 105 is illustrative of a computer display screen associated with a variety of suitable computing devices, described below with reference to FIGS. 7 through 9.

A pair of displayed software application user interfaces and associated user content is displayed on the display surface 110. The user interfaces 115, 135 are illustrative of user interfaces and associated user content enabled by a variety of software applications, for example, word processing applications, spreadsheet applications, slide presentation applications, electronic mail applications, notes applications, calendaring applications, and the like. That is, the user interfaces 115, 135 are illustrative of any graphical display components that may be displayed onto a computer-enabled display surface 110 for review and use according to associated software application functionality. As illustrated in FIG. 1A, the user interfaces 115, 135 are illustrative of a pair of word processing application user interfaces having a plurality of functionality controls 120, 140, service panes 125, 145, and user content display areas 130, 150. As should be understood, the illustrated user interfaces 115, 135 are for purposes of example only and are not limiting of the vast number and types of graphical display components that may be displayed and managed according to embodiments of the invention described herein.

The graphical rendering, animation and display component 160 is illustrative of one or more software or hardware enabled processes for generating, rendering, storing, and displaying graphical display components to a computer display surface 110, as illustrated in FIG. 1A. That is, the graphical rendering, animation and display component 160 may be illustrative of a software application containing sufficient computer-executable instructions for causing the generation, rendering, storage, and displaying of graphical display components to a computer display surface 110 for representing underlying functionality and data. For example, the component 160 may be a software application or software application component associated with a software application for generating, rendering, storing, and displaying software application user interfaces and for displaying user data in association with displayed user interfaces. According to one embodiment, the component 160 may be in the form of a user interface and content display and animation compositor application. Likewise, the component 160 may be illustrative of a software application module associated with or contained in a computer operating system (e.g., a desktop window or frame manager application) operative to generate, render, store and display graphical display components to a computer display surface 110.

In addition, the component 160 may be illustrative of a software application or software application module operative to provide for animation functions associated with graphical display components. For example, the component 160 may be operative to provide for on-screen animations such as the movement of displayed items from one area of a display screen to another or from one displayed object to another, or the like. According to embodiments of the present invention, the graphical rendering, animation and display component 160 is operative to track activity associated with a displayed graphical display component for determining whether a given graphical display component has become idle for a prescribed duration, for example, 30 seconds, and for ceasing processing of and discarding data stored for such an idle graphical display component for conserving memory capacity, processing resources, and power consumption.

The memory component 170 is illustrative of any local or remote memory storage area at which data representing a displayed graphical display component may be stored. The power supply/battery component 800 is illustrative of one or more sources of electrical power utilized for generating, rendering, storing, and displaying one or more graphical display components on a computer-enabled display surface 110, as described herein.

Figure 1B:
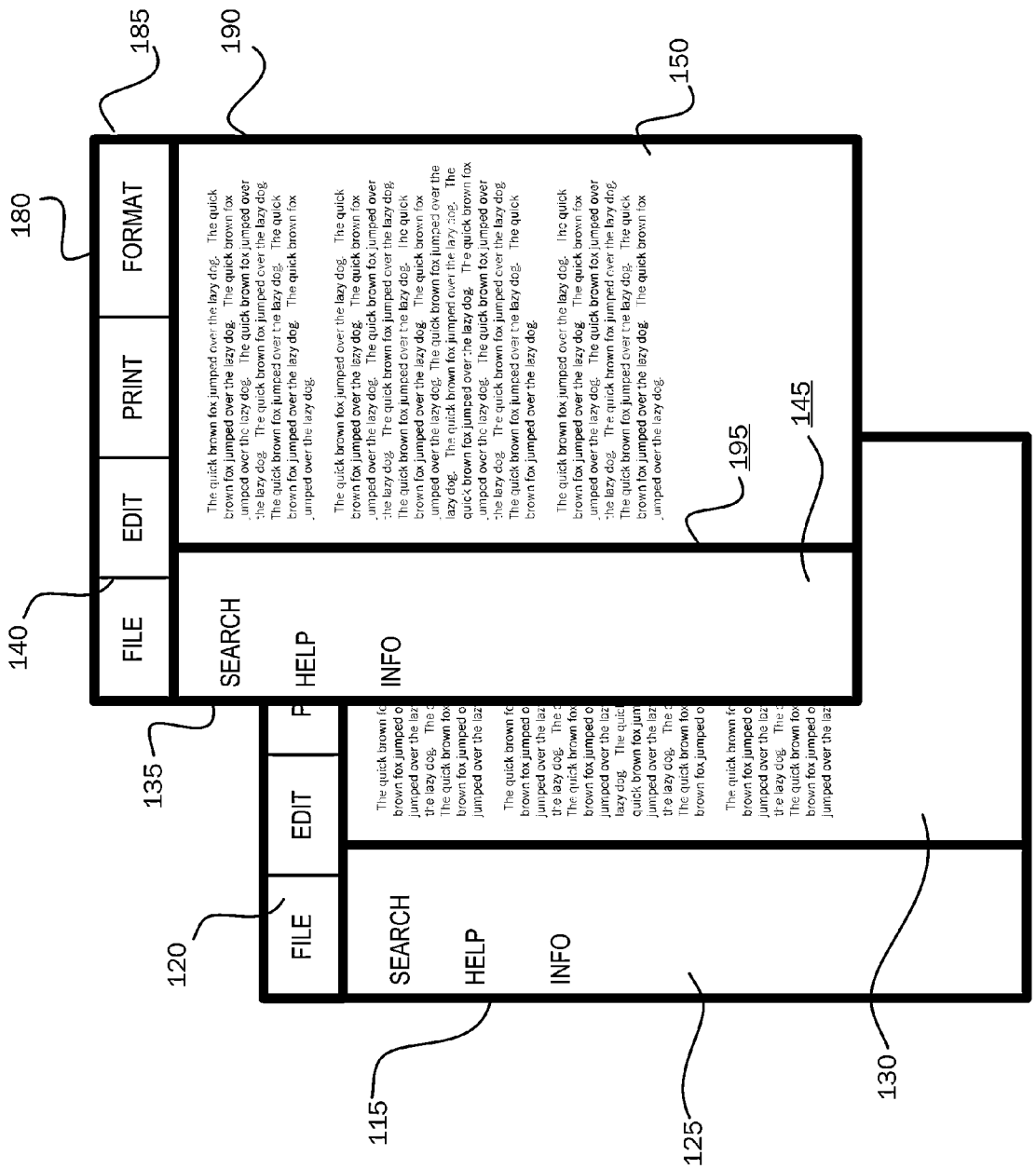
FIG. 1B illustrates two example displayed word processing application user interfaces associated with two displayed word processing documents where each of the displayed user interface components contains a plurality of display components.

FIG. 1B illustrates two example displayed word processing application user interfaces associated with two displayed word processing documents where each of the displayed user interface components contains a plurality of display components. For example, the user interfaces 115, 135 may be illustrative of a pair of word processing documents displayed side-by-side or in an overlay orientation, as illustrated in FIG. 1B. A user may have launched the two instances of the word processing application user interfaces 115, 135 for reviewing and/or editing two word processing documents during one editing session. Consider for another example, a user may have launched an electronic mail user interface, a word processing application user interface, a slide presentation application user interface, and a spreadsheet application user interface on the same display surface 110, and each of the launched and displayed user interfaces may be running concurrently.

As described above, each graphical display component or each collection of graphical display components (e.g., a collection of display components compromising a user interface and associated user data) requires processing resources, memory capacity and power consumption for generating, rendering, storing and displaying the graphical display components. When multiple items are displayed, the need for memory capacity, processing resources and power consumption goes up dramatically. For example, if one of the applications, for example, the word processing application is presently displaying four documents, and if a spreadsheet application is currently displaying two spreadsheet documents, and if the electronic mail application is displaying two opened electronic mail items, then 10 full screen display frames or windows, each requiring significant memory capacity, for example, 32 megabytes of memory capacity each may result. In total, the example user interfaces and content items may require a significant combined memory capacity, for example, 320 megabytes of memory. According to embodiments, ceasing processing and discarding data from memory representing those displayed items not active at any given time may result in a substantial savings of memory capacity and processing resources associated with all but one of the displayed content items (i.e., a single content item currently active owing to user action or processing action).

Referring still to FIG. 1B, each display component displayed on a computer screen surface 110 may be displayed as a single display object or as a collection of display objects. According to one embodiment, content items may be displayed in a display frame or window in which a collection of display components may be organized for providing a desired display of software application functionality and associated user content. Referring to FIG. 1B, the user interface 135 includes a top level display frame or window 180 and includes a number of sub or child display frames or windows 185, 190, 195. For example, a collection of software application functionality buttons or controls 140 may be displayed in the child display frame or window 185, user content 150 may be displayed in a sub or child display frame or window 190, and functionality and content associated with a service pane 145 (e.g., search functions, help functions, information functions, etc.) may be displayed in a sub or child display frame or window 195. As should be appreciated, the example word processing user interfaces and associated user data illustrated in FIG. 1B are for purposes of example and illustration only and are not limiting of the vast number and types of user interfaces and associated user data that may be displayed and that may be managed according to embodiments of the present invention.

As briefly described above, each display frame or window and the display components contained therein may be managed by a display management component (also referred to herein as a "layer host"). That is, the layer host may manage the display components contained in each display frame or window that get drawn to a display screen. A given display component may be shared across multiple display frames or windows and thus may be referenced by multiple layer hosts. For example, a "font" button may be presented in a display frame or window having a group of formatting buttons. The same "font" button may be presented in a second display frame or window having a group of frequently used buttons. And, the same button may be in yet another display frame or window associated with a menu of formatting functions that pops up near an edited portion of text to allow quick use of the example "font" button during an editing session. According to this example, a layer host would be assigned to each of the three display frames or windows for managing the display components contained therein. If all three display frames or windows are currently active, then all three layer hosts will be designated as active.

Each display component is assigned a reference count equal to the total number of active layer hosts that references it. Following from the foregoing example, if each display frame or window containing the "font" button is active, then a total of three active layer hosts will reference the "font" button, and thus, the "font" button will have a reference count of three (3). If a given display frame or window becomes idle for a prescribed duration, for example, 30 seconds, during which no user or processor action is performed on the display frame or window, then the layer host assigned to that display frame or window will go idle, and the reference count of any display components it references will be decremented by one (1). Following the above example, if one of the display frames or windows containing the "font" button, for example, the pop up menu, goes idle, then the corresponding layer host will go idle and the reference count for the "font" button will be decremented by one (1) to a resulting reference count of two (2). As long as a display component has a reference count of one or more, storage and processing associated with the display component is maintained. However, if the reference count for any display component is decremented to zero (0), then the data representing the display component is discarded from memory and processing required for maintaining (updating) the display component is terminated until the display component is needed again.

According to embodiments, a reference count is incremented for each instance of a display component managed by a single management component or layer host. For example, if functionality buttons or controls 140 displayed in user interface 135 share display components (e.g., "file," "edit," etc.) with the functionality button controls 120 displayed in user interface 115 and these display surfaces are both active at the same time, a reference count of two would be applied to these display components. If the display frames or windows containing these functionality buttons or controls 120, 140 for either of the instances of the example user interface 115, 135 become idle, the reference count may be decremented by one for a resulting reference count of one.

If all layer hosts referencing a given display component go idle, then the reference count for the display component is decremented to zero, and the display component may be discarded. Following from the above example, if both display frames 120, 140 become idle, then the reference counts for the associated display components may be decremented to zero, and the display components may be discarded, as described herein. For example, referring still to FIG. 1B, if the buttons or controls 140, for example, "file," "edit," "print," and the like associated with a word processing application are required for each displayed instance of the example word processing application user interface, then data representing the display of those graphical display components need only be stored once for all instances, and processing associated with maintaining the display and updating the display of those displayed components need only be conducted once. Thus, 10 instances of the example word processing application user interface could be displayed on the computer display screen surface 110, and if any given display management component or layer host is active that references a display component in one of the instances of the displayed user interface, then a reference count of one would be applied to the referenced display component. As long as a reference count of one or greater is maintained for one of the display components contained in the display frame managed by the layer host, then the display frame or window in which a given display component is contained may be maintained. As should be appreciated, any display components having reference counts decremented to zero may be discarded.

Referring still to FIG. 1B, consider for example that instead of two instances of the example word processing application user interface 115, 135, a user has launched 10 instances of the example word processing application user interface 115, 135. Consider further for example that the service panes 125, 145 displayed in the display frames or windows 195 are idle in all instances of the displayed user interfaces. That is, consider for example that no user action or system action is associated with any functionality or content items contained in the service panes 125, 145 of any of the example 10 instances of the example word processing application user interfaces 115, 135. In such a case, the management component or layer host charged with managing the graphical display components contained in the service panes 125, 145 would become idle and the reference counts of the associated display components would hit zero because every management component that uses (or references) these display components is idle. Thus, according to embodiments of the present invention, data representing the components or content items displayed in each of the instances of the service panes 125, 145, processing resources associated with the display of those service panes, and electrical power requirements associated with memory storage and processing associated with those display components may be discarded, allowing memory capacity, processing resources and power consumption associated with those service panes to be conserved. However, if at any time one of the example service panes 125, 145 becomes active again, for example, where a user focuses on one of the instances of the service pane 125, 145, for example, via a mouse click in one of the instances of the service pane, then the display frame containing the active service pane would become active and its display components would get recreated. Alternatively, the active display frame would make use of display components used by other management components (layer hosts), and the reference count of these display components would be incremented accordingly.

Figure 2:
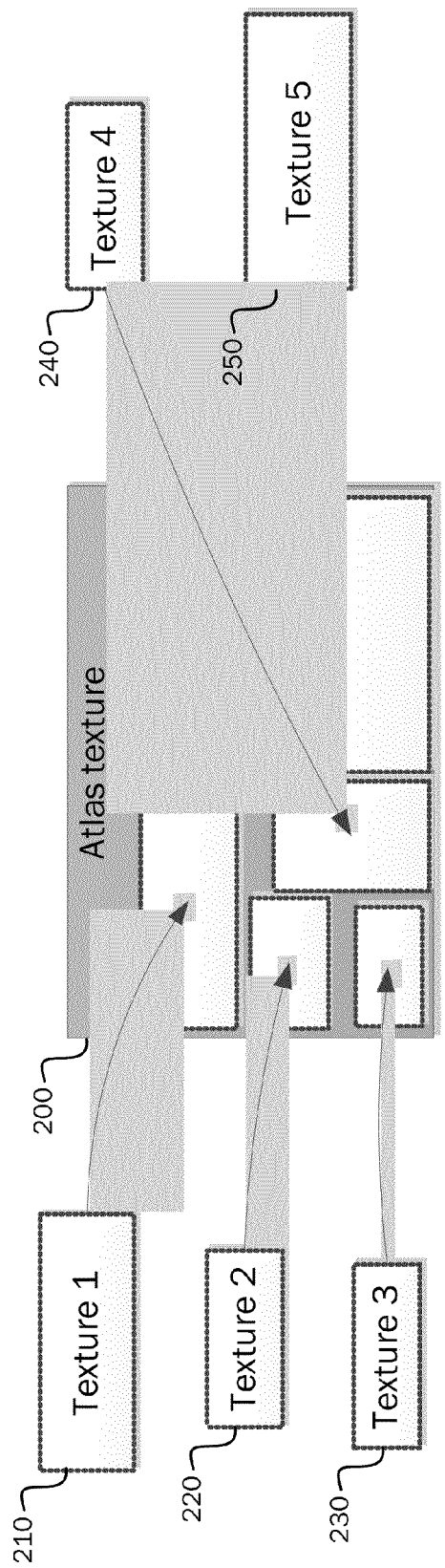
FIG. 2 illustrates a collection of display components or textures grouped together in a display component grouping or atlas.

FIG. 2 illustrates a collection of display components or textures grouped together in a display component grouping or atlas 200. As described herein, for a given displayed user interface or content item, a number of individual display components (also referred to herein as textures) may be generated and displayed. According to one embodiment, in order to reduce the impact of the time associated with the generation and display of individual display components or textures, a grouping of display components or textures may be assembled together in a single display component grouping or atlas for maintaining a number of individual display components to prevent discarding and/or processing individual display components on a frequent basis. For example, referring back to FIG. 1B, each of the individual buttons or controls 140 displayed in a functionality frame, window or tool bar for the example user interfaces may be grouped together in a single display component atlas, and generation and display of each individual display component assigned to and grouped into a given atlas may be maintained as long as other display components grouped into that atlas are maintained. Alternatively, as described below, individual idle display components may be discarded from a display component atlas and display component atlases may be combined or compacted for conserving resources.

For example, if graphical display components or textures associated with each of the buttons or controls 140 are grouped together into a single display component atlas 200, where each of the display components or textures 210, 220, 230, 240, 250 is illustrative of each of the buttons or controls "file," "edit," "print," "format," and the like, data stored in association with the generation of each of those individual display components or textures and processing associated with the generation and storage of each of those display components or textures may be combined and maintained in association with the display component atlas. That is, if any one of those display components, for example, the "file" button component is used by or referenced by an active management component or layer host, but if each of the other display components, for example, the "edit," "print," "format," and the like are not used by or referenced by an active management component or layer host, all the idle display components may be maintained as active display components owing to their inclusion in the display component atlas 200 along with the presently active display component associated with the "file" button. That is, because the atlas would still contain one display component for the "file" button, the entire atlas cannot be discarded. If each of the display components contained in a given atlas 200 becomes idle for a prescribed duration, for example, 30 seconds, then data storage and processing associated with the entire data component atlas may be discarded, as described herein. Thus, in such cases, a logical grouping of display components or textures may be assembled in a display component atlas to prevent unnecessary and frequent discarding and regeneration of individual display components.

Figure 3:
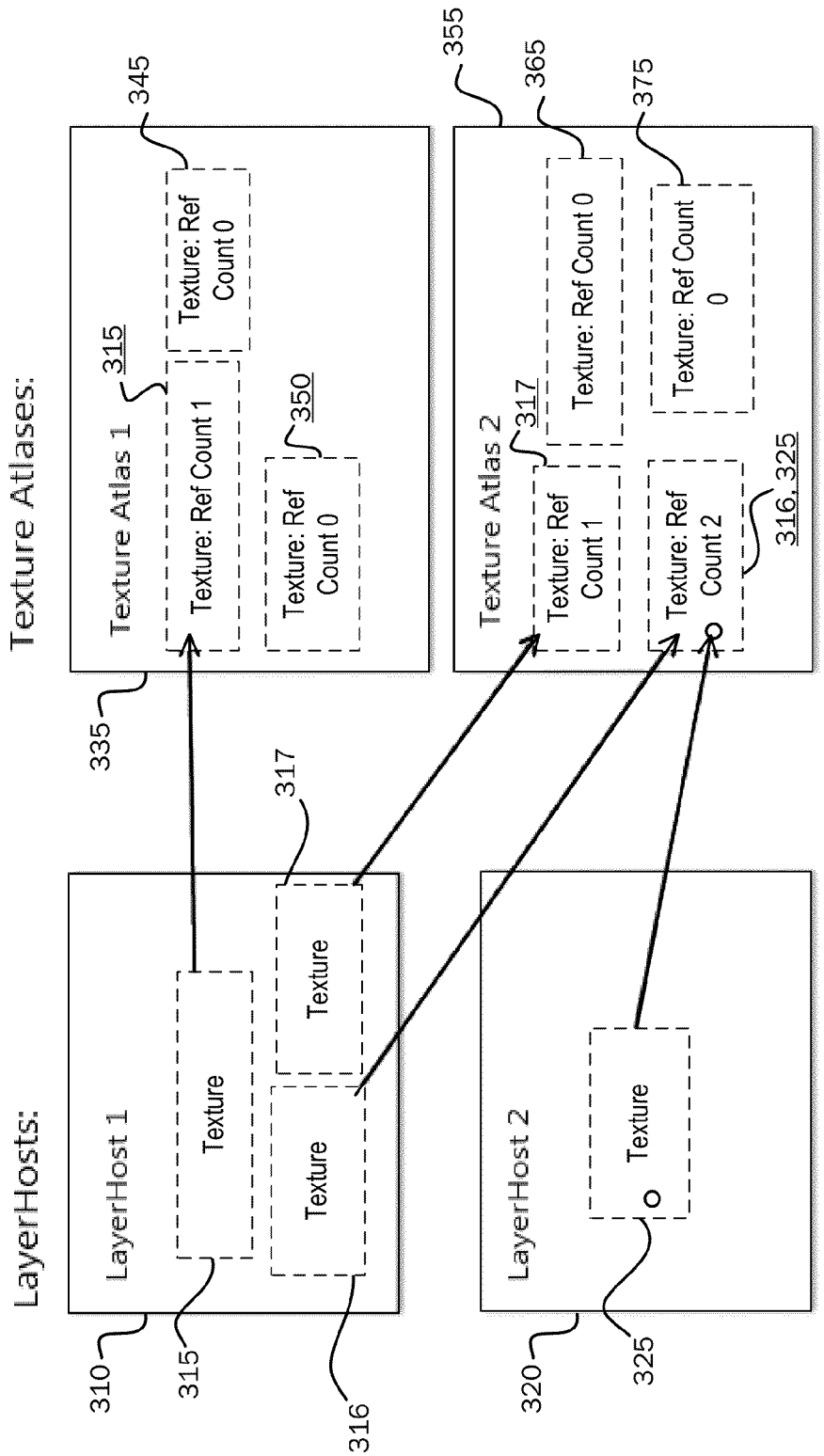
FIG. 3 is a simplified block diagram illustrating a mapping and tracking of a number of displayed frames or windows that reference a given display component.

Referring now to FIG. 3, display components grouped into a given display component atlas may be mapped to one or more layer hosts. As illustrated in FIG. 3, a first display component atlas 335 may include display components for a given type or specified grouping of components, such as formatting functionality controls/buttons like "font," "color," and the like. A second display component atlas 355 may include display components for a second type or grouping of components, such as top-level command controls/buttons like "file," "edit," and the like. The first atlas may contain one or more of such display components across a number of software applications or display frames/windows managed by a number of different layer hosts. Likewise, the second atlas may contain a different one or more of such display components across a number of software applications or display frames/windows managed by a number of different layer hosts.

Referring still to FIG. 3, a given layer host may map display components into more than one display component atlas. Following from the foregoing example, the first layer host 310 illustrated in FIG. 3 may be charged with managing a number of display components 315, 316, 317 contained in a toolbar display frame or window 185 (see FIG. 1B). The layer host 310 may map a first display component or texture 315 associated with a formatting button to the first display component atlas 335, and the layer host 310 may map a second and third display components or textures 316 and 317 associated with a couple of command buttons like "file" and "edit" to the second display component atlas 355. A second layer host 320 may be associated with a different managed display frame or window and may map another display component or texture 325 for another command button to the second display component atlas 355. Thus, according to this example, the first display component atlas 335 includes a number of similar or related display components from one or more display hosts, and the second display component atlas includes a number of similar or related display components from one or more other display hosts. As should be appreciated, the examples used to describe the layer hosts and display component atlases are for purposes of illustration only and are not limiting of the vast number of different types of display components that may be managed according to embodiments of the invention described herein.

Referring still to FIG. 3, as described above, reference counts associated with individual display components are tracked based on the number of management components or layer hosts referencing a given display component grouped in a given display component atlas. For example, the first display component 315 illustrated in the first layer host 310 maps to a display component grouped with the first display component atlas 335. A reference count of one is incremented for the first display component 315 meaning that the associated display component is presently active. On the other hand, the display components 345, 350 illustrated in the first display component atlas 335 are not mapped to either of the illustrated layer hosts 310, 320 and show reference counts of zero meaning that the associated display components are no longer referenced by an active display component manager for a prescribed duration (e.g., 30 seconds). The display component 316 illustrated in the first layer host 310 and the display component 325 illustrated in the second layer host 320 are both mapped to the second display component atlas 355, and thus a corresponding display component 316, 325 illustrated in the second display component atlas 355 shows a reference count of two indicating that the associated display component, for example, a displayed button, displayed content item, displayed image, or the like is presently active in two display frames or windows being managed by two layer hosts at the present time.

Display component atlases may consume a significant amount of memory capacity. They start out empty and are later filled with individual display components. When the memory capacity of an atlas is fully utilized, another atlas is created. In order to conserve memory capacity, it is desirable to discard un-needed atlases when possible. This requires deleting display components that are no longer used by active display component managers or layer hosts and moving display components to other atlases that have room for them, thus leaving one or more atlases empty (and available for being discarded).

According to one embodiment, in order to reduce memory requirements for display component atlases, display components grouped into display component atlases may be discarded when the reference count becomes zero when an associated layer host goes idle. After one or more display components are discarded owing to a reference count of zero, the graphical rendering, animation and display component 160 may compact an associated display component atlas allowing atlases to be refactored and/or combined to prevent the creation of new atlases requiring additional memory capacity. For example, if a given atlas requires 16 megabytes of memory capacity even if it contains a number of display components requiring substantially less than 16 megabytes of memory capacity, the atlas may be refactored to a lower memory capacity requirement, or the atlas may be combined with a second atlas where the combined atlases require 16 megabytes of memory capacity or less. As should be appreciated, 16 megabytes of memory per atlas is for purposes of example only and is not limiting of the amount of memory capacity that may or may not be utilized for a given display component atlas.

Figure 4:
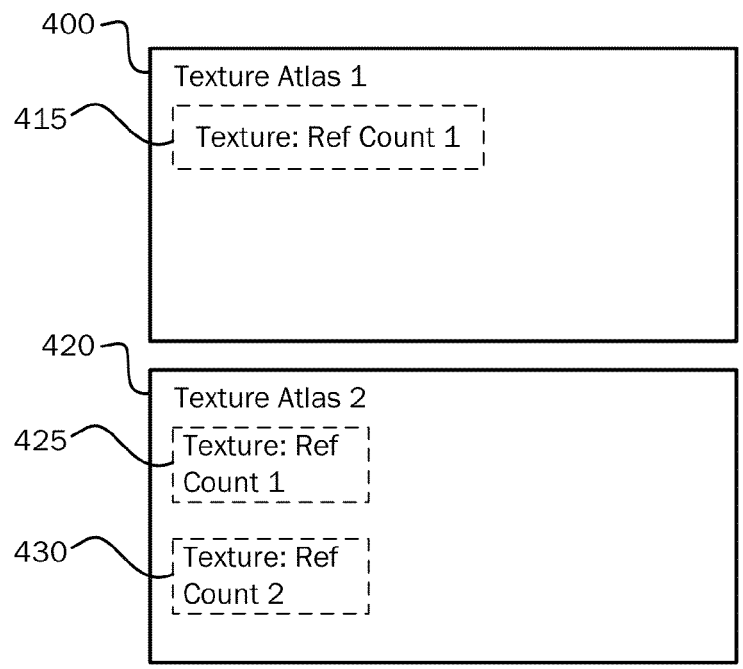
FIG. 4 is a simplified block diagram illustrating a compacting or combining of two or more groupings or atlases representative of a plurality of associated display components.
Figure 4:
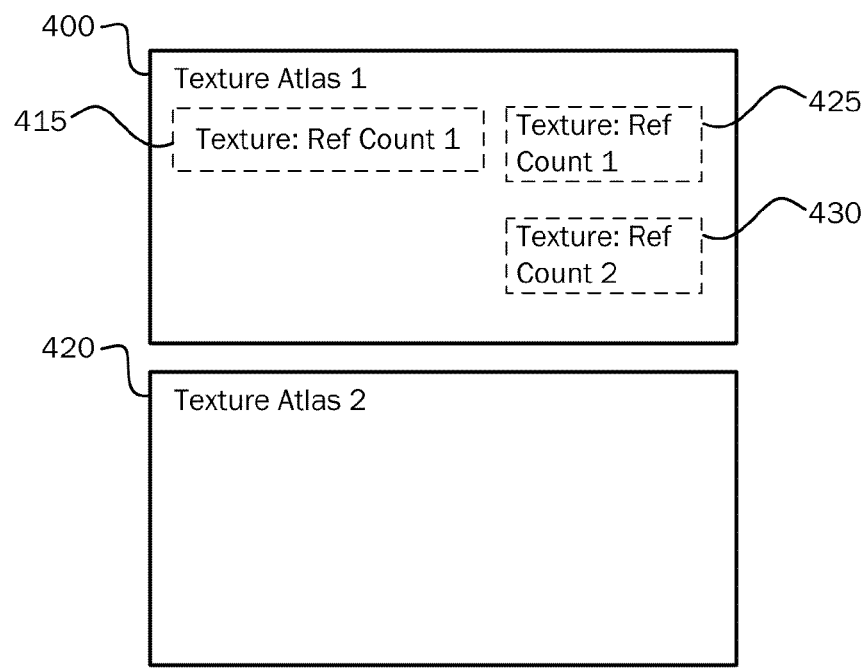

Referring to FIG. 4, atlases may be compacted and refactored to reclaim unused space which involves moving display components among atlases and organizing the display components within the atlases to reduce the number of atlases required and to increase the regions of free space within the atlases. For example, a first display component atlas 400 includes a single display component or texture 415 having a reference count of one. A display component atlas 420 is illustrated having two display components or textures 425, 430 having reference counts of one and two respectively. In order to reclaim unused space available in the first display component atlas 400, the display components 425, 430 contained in the second display component atlas 420 may be moved into the first display component atlas 400 such that the first display component atlas 400 now includes three display components 415, 425, 430. After the display components are moved from the second display component atlas 420, the second display component atlas 420 becomes empty, and may be discarded for recovering memory capacity otherwise associated with the display component atlas 420.

Figure 5:
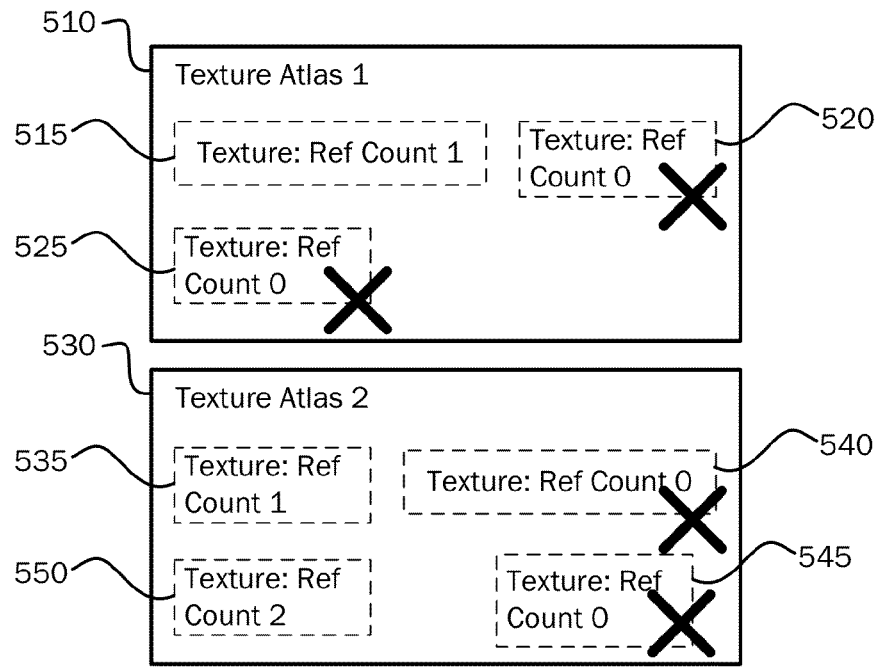
FIG. 5 is a simplified block diagram illustrating a compacting or combining of two or more groupings or atlases representative of a plurality of associated display components.
Figure 5:
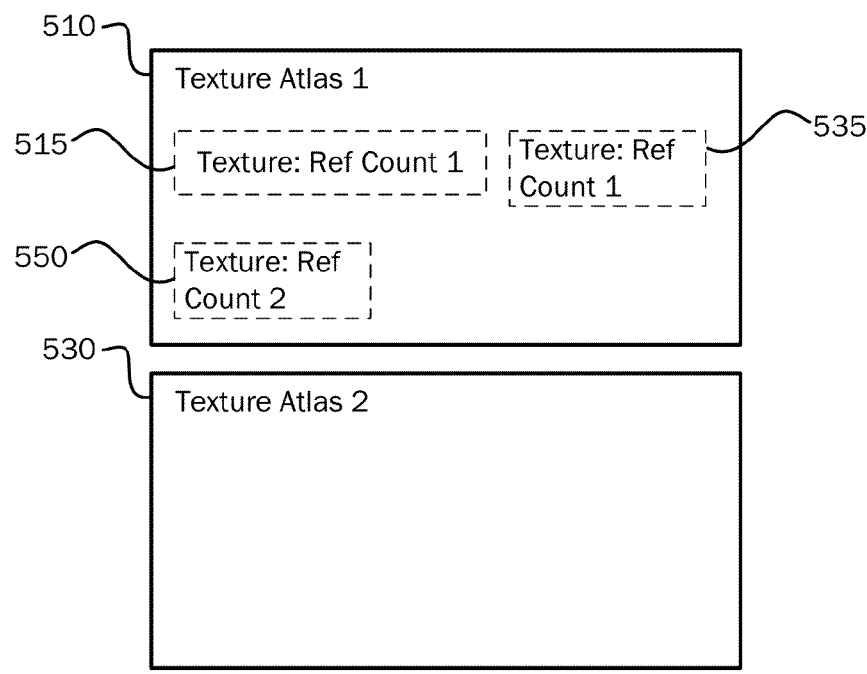
Figure 6:
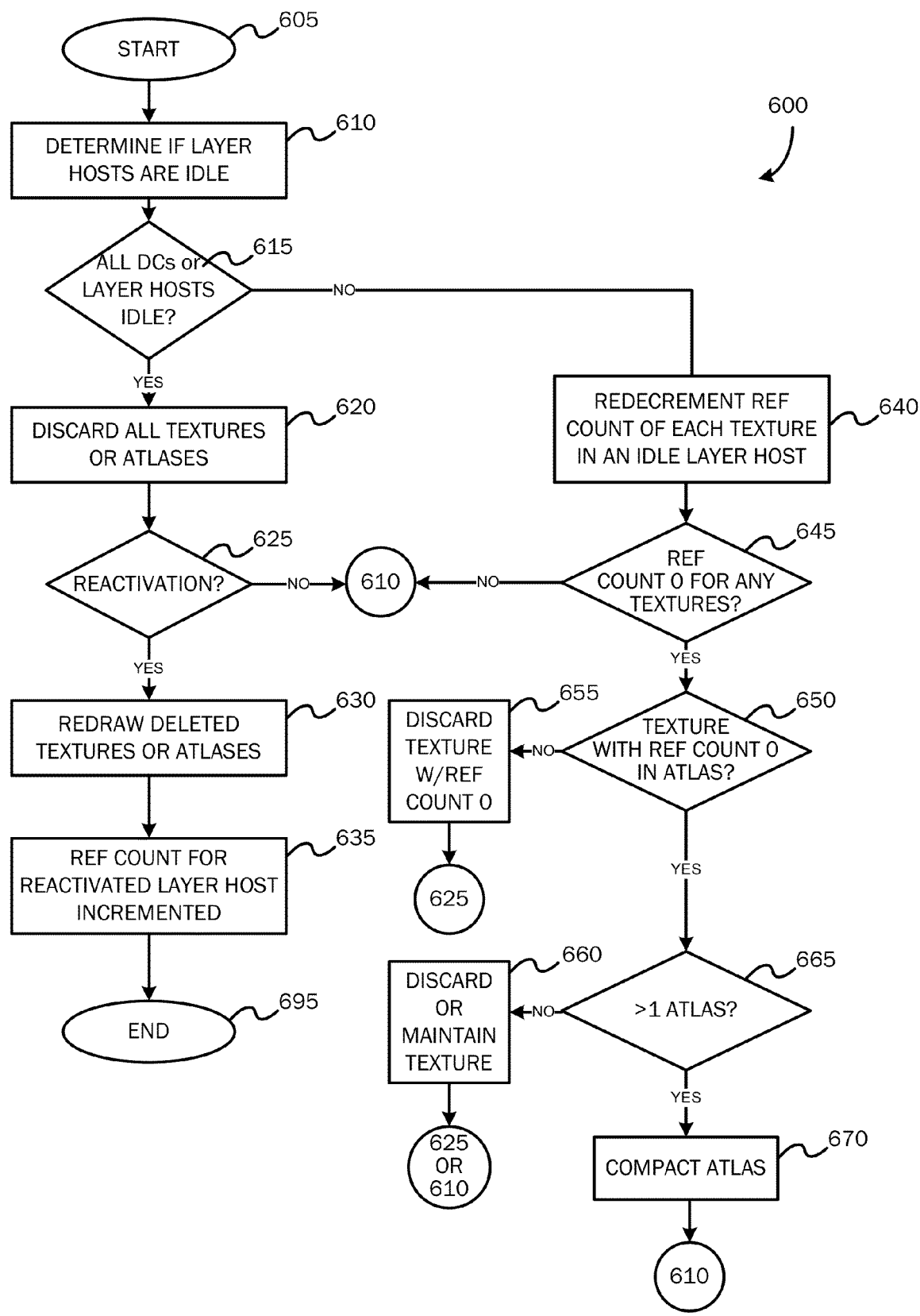
FIG. 6 is a flow diagram illustrating a method of discarding memory storage and processing for idle computer-generated graphical display components for conserving memory capacity, processing resources and power consumption.

Referring to FIG. 5, according to an another embodiment, and as briefly described above, display components are not discarded from a display component atlas unless all display components in a given atlas reach a reference count of zero allowing for a discarding of the entire atlas. According to this embodiment, unnecessarily discarding a given display component from a display component atlas where the display component may be utilized again on a relatively frequent basis is prevented. Referring to FIG. 5, if a given display component reaches a reference count of zero and it is not contained in a display component atlas, then the display component is immediately discarded. However, if a display component reaches a reference count of zero and is contained within a display component atlas along with other display components that have not reached a reference count of zero, then all display components contained within the display component atlas are maintained.

According to this embodiment, atlases may be compacted when display components contained in them have reference counts of zero allowing them to be discarded. Referring to FIG. 5, when an atlas is compacted according to this embodiment, display components having a reference count of zero may be discarded, and remaining display components may be combined into a fewer number of atlases for allowing empty atlases to be discarded. As illustrated in FIG. 5, the first display component atlas 510 includes two display components 520, 525 having reference counts of zero. A second display component atlas 530 likewise includes two display components 540, 545 having reference counts of zero.

According to this embodiment, the display components having reference counts of zero are discarded and the remaining display components 515,535,550 contained in the two example display component atlases 510,530 are combined into a single display component atlas 510 having only display components 515,535,550 with reference counts of one or more. The empty display component atlas 530 may then be discarded for freeing up memory capacity associated with the empty display component atlas.

When a display component is discarded, as described above, it may be reactivated based on user action or based on system action requiring an update of a previously discarded display component. For example, referring back to FIG. 1B, if a display component associated with a displayed button or control, for example, the "format" button contained in the display window 185, has hit a reference (ref) count of zero and memory and processing for the display component has been discarded, user action or system action may require the previously discarded display component associated with the example "format" button to be reactivated. For example, if a user focuses on the "format" button via a mouse click, touch, stylus contact, gesture, voice command or other user interaction the display component associated with the example "format" button may be generated, rendered, stored to memory and drawn to a computer display surface 110 by the graphical rendering, animation and display component 160.

Likewise, if system action, for example, an asynchronous process is initiated by an associated software application on the previously discarded display component, the display component may be reactivated. For example, if a word processing software application associated with the example user interface illustrated in FIG. 1B is configured to enable certain formatting operations on a given document, if the given document is launched and the display component associated with the "format" button previously has been discarded, as described above, the display component may be reactivated wherein the underlying display component is generated, rendered, stored and drawn to the computer-enabled display surface 110 as part of the displayed user interface 135, illustrated in FIG. 1B.

According to embodiments, when a given display component is updated, as described above, an associated management component or layer host is likewise reactivated for the reactivated display component. The reactivated layer host asks an associated client application, for example, a word processing application, an operating system, or the like to redraw the previously discarded display component, and the layer host increments the reference count of each display component referenced by the layer host by one count.

When a discarded display component is regenerated, stored and drawn to the display surface, a cost is incurred in terms of processing resources, memory capacity and power consumption. According to one embodiment, rather than discarding the display component altogether, it may be maintained by a separate application, for example, the computer's operating system, and it may be reclaimed for display when it becomes active. According to this embodiment, instead of completely deleting/discarding a given display component or texture from memory, it may be offered back to the operating system 705, 864 (see FIGS. 7, 8B) for maintenance which means that the software application utilizing the display component or texture (having a ref count of zero) has effectively freed the memory space and processing resources required for the idle display component, but the operating system receiving the idle display component maintains the idle display component until it is once again needed by the discarding software application. That is, during after a given display component becomes idle for the prescribed duration, additional processing is terminated by the software application using the display component (e.g., word processing application) and data representing the idle display component is discarded from memory space allocated for the software application using the display component.

All tracking and management of display components is performed as described above, but instead of actually discarding idle display components, they are passed to the operating system for maintenance until they are needed again. When such display components of ref count zero are needed again, the application charged with maintaining them, for example, the operating system passes them back to the requesting software application. While memory space and processing resources for the idle display components are still required by the operating system, memory space and processing requirements associated with the software application discarding the idle display components are conserved. According to one embodiment, if the operating system comes under memory pressure (i.e., it lacks memory capacity to store the display components); the operating system may discard the offered storage resources. In such a case, if the application that discarded the display components to the operating system needs them again, it will have to recreate them.

According to an alternate embodiment, the graphical rendering, animation and display component 160 is illustrative of one or more software or hardware enabled processes for generating, rendering, storing, and displaying graphical display components to a computer display surface 110, as illustrated and described with reference to FIG. 1A, and the component 160 also is operative to generate and maintain one or more non-graphical display resources that may be discarded from memory on idle. Such non-graphical resources may be used to manage graphical display components described above (e.g., display components representing buttons, controls, user content objects, etc.), and such non-graphical resources may include or contain various graphical display components. According to this embodiment, these non-graphical resources may be discarded by one or more processes apart from the processes described herein for discarding graphical display components and associated resources. For example, such non-graphical resources may be discarded when they are idle for a prescribed duration, they may be discarded when they are not utilized by the component 160 for a prescribed duration, they may be discarded when graphical resources they are managing are idle or have been discarded, they may be discarded on demand, or they may be discarded according to any other suitable time or method when their services are not needed.

However, when one or more of such non-graphical resources are managing and/or containing a graphical display component, discarding a given non-graphical resource will also discard the associated graphical resources (e.g., graphical display components) it is managing or containing. In such a case the process of discarding non-graphical resource will conflict with the process for discarding graphical resources, as described above with reference to FIGS. 1A-5. That is, a graphical display component may be discarded as described with reference to FIGS. 1-5, but if another process later discards resources that reference or contain the discarded graphical display component, this will cause processing to occur on the layer host that manages the discarded graphical display component causing the layer host to exit an idle state and to request the graphical display component that has just been discarded to be recreated, stored and rendered to the display surface.

For example, referring back to FIG. 1A, a help function is illustrated in the service panes 125, 145. According to embodiments, a help function application/process may be responsible for one or more non-graphical resources associated with providing help content in the service panes 125, 145, and the help function application/process may also be responsible for managing or containing one or more graphical display components, such as a help search field and associated help content, that is displayed in the service panes 125, 145. If the non-graphical resources responsible for the help function are discarded, then the graphical resources associated with the help function display components may also be discarded which will be in conflict with or not follow the display component process described above with reference for FIGS. 1A-5. That is, the display components associated with the help function may be discarded even though their reference counts have not reached zero.

To prevent such a processing conflict, the process that discards the non-graphical resource that manages or contains the graphical display component needs to be able to control when the non-graphical resource is discarded. In addition to these conflicts that may occur when one process discards a first graphical resource and a second process discards one or more resources that reference or contain first graphical resource, it may be desirable to discard graphical resources at specific times other than when a layer host goes idle, as described above with reference to FIGS. 1A-5. According to this embodiment then, instead of discarding a non-graphical resource prematurely when one or more graphical resources that depend on it have reference counts that have not reached zero (0), the discarding of the non-graphical resource may be overridden and the display component depending on the non-graphical resource may be maintained until the discarding of the non-graphical resource is requested by another application (e.g., one or more other applications that also reference the graphical resource) to prevent the processing conflict described above.

Thus, when a process that includes a non-graphical resource that, in turn, manages or includes a graphical display component, according to this embodiment, the graphical display component will be maintained until the non-graphical display component that manages or includes the graphical display component is discarded on request. Such a discard on request method also may be useful when an application has one or more other graphical resources (e.g., graphical display components) that may be discarded owing to reference counts of zero but that depend on one or more non-graphical resource processes wherein it is necessary for the application responsible for the graphical resources to control the order of execution (of generating and rendering display components) during entry and exit to/from idle states to ensure each display component and associated memory cache is built in the right sequence.

Having described an operating environment for and aspects of embodiments of the invention above with reference to FIGS. 1-5, FIG. 6 is a flow diagram illustrating a method of discarding memory storage and processing for idle computer-generated graphical display components for conserving memory capacity, processing resources and power consumption. The routine 600 begins at start operation 605 and proceeds to operation 610 where a determination is made by the graphical rendering, animation and display component 160 as to whether any layer hosts are idle. According to one embodiment, a timer is set for each display component. If a prescribed duration, for example, 30 seconds elapses in which no user or system action is received for a given display component, then the display component is considered idle. As should be appreciated, a number of durations may be utilized for determining whether a given display component has gone idle.

At operation 615, a determination is made as to whether a given single layer host being monitored or whether all layer hosts being monitored are idle. If all monitored layer hosts are idle, the routine proceeds to operation 620, and all such display components and/or associated display component atlases are discarded.

At operation 625, a determination is made as to whether any display components and/or associated display component atlases should be reactivated owing to user action or system action. For any display components and/or associated display component atlases that should be reactivated, the routine proceeds to operation 630 and the discarded display components and/or associated display component atlases are regenerated and stored, and the associated display components are redrawn and/or updated on the associated computer-enabled display surface. At operation 635, the reference count for reactivated display components is incremented by one.

Referring back to operation 615, if all layer hosts are not idle, the routine proceeds to operation 640 and the reference count for any display component associated with a given layer host is decremented by one count. At operation 645, a determination is made as to whether the reference counts for any display components have been decremented to zero. If no reference counts for any display components have been decremented to zero, the routine proceeds back to operation 610 where the determination as to whether any display components have gone idle is continued.

If the reference count has been decremented to zero for any display components at operation 645, the routine proceeds to operation 650 and a determination is made as to whether display components having a reference count of zero are contained in a display component atlas. If not, the routine proceeds to operation 655 and any display components having a reference count of zero are discarded.

Referring back to operation 650, if a display component having a reference count of zero is contained in a display component atlas, the routine proceeds to operation 665 and a determination is made as to whether the display component having a reference count of zero is associated with more than one display component atlas. If the display component having a reference count of zero is not associated with more than one display component atlas, the routine proceeds to operation 660.

At operation 660, according to one embodiment, display components having a reference count of zero may be discarded even if they are contained in a display component atlas having other display components with reference counts of one or more in order to free up memory space associated with the display component atlas. Alternatively, if a display component is contained in a single display component atlas having a reference count of zero, and other display components are contained in the display component atlas having a reference count of one or more, then the display component having the reference count of zero is maintained in the display component atlas.

Referring back to operation 665, if a display component having a reference count of zero is contained in more than one display component atlas, the routine proceeds to operation 670, and the two or more display component atlases may be compacted and/or refactored, as described above with reference to FIGS. 4 and 5, if such compaction and/or refactoring allows for better utilization of one or more atlases without requiring the generation of a new atlas, or if such compaction and/or refactoring allows for the combining of two or more atlases to allow for discarding an empty atlas.

For any display components discarded as described herein, the routine proceeds to operation 625 for a determination as to whether the discarded display components should be reactivated, and for any display components not discarded, the routine proceeds back to operation 610 where a determination of whether the display components are active or inactive (i.e., idle).

As described above, according to one embodiment, for any display component requiring discarding owing to an idle status, the idle display component may be passed to separate application, for example, an operating system for maintenance of the idle display component apart from the software application using the idle display component. For example, if a display component for a "print" button used by a word processing application has gone idle, instead of discarding the display component, it may be passed to an operating system for maintenance. While the operating system will require memory space and processing for the idle display component, the example word processing application will free up the space for use for other operations. When the idle display component becomes active again, the requiring application, for example, the word processing application may reclaim the idle display component from the separate application (e.g., the operating system). As described above, if the operating system comes under memory pressure (i.e., it lacks memory capacity to store the display components), the operating system may discard the offered storage resources. In such a case, if the application that discarded the display components to the operating system needs them again, it will have to recreate them.

Figure 7:
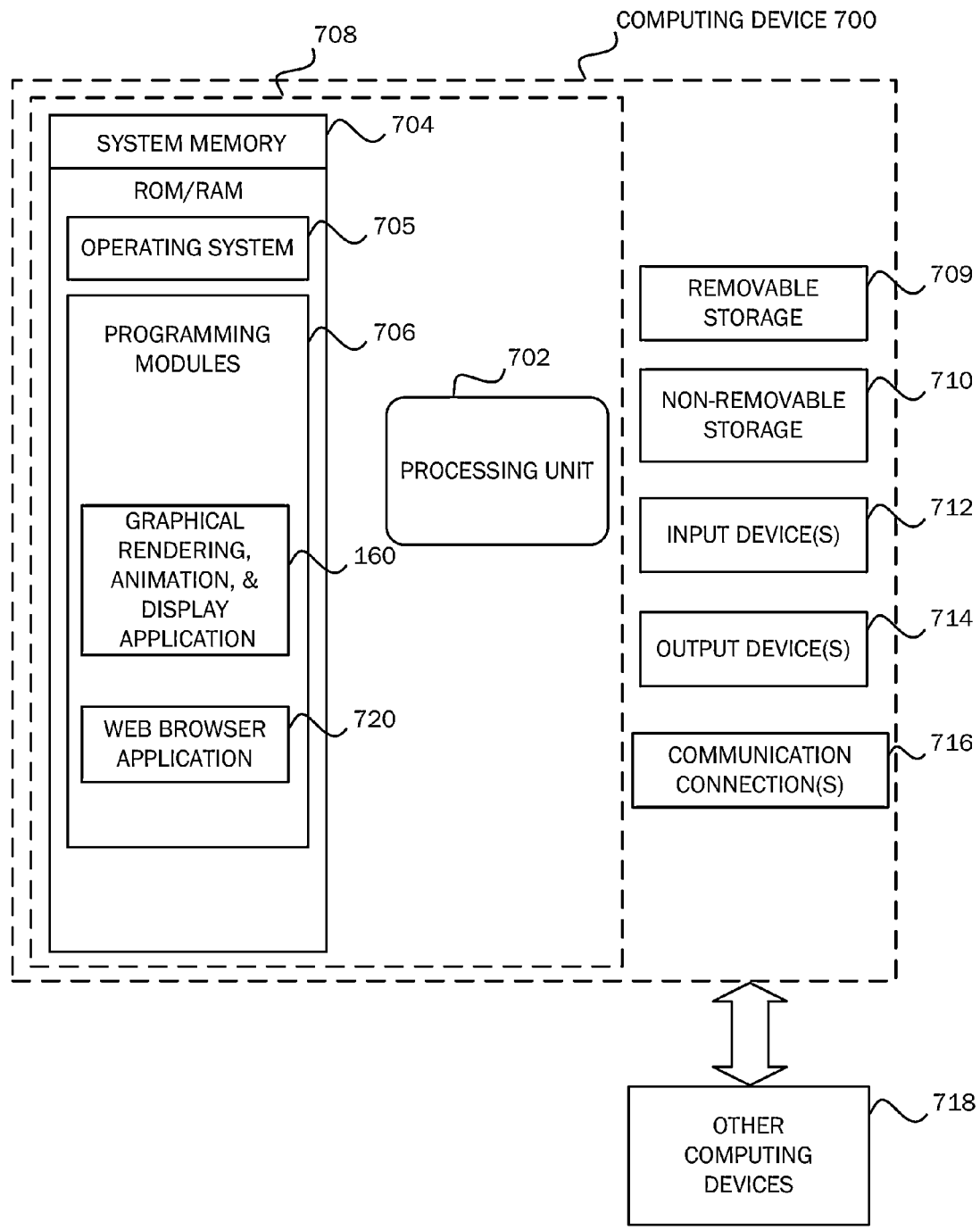
FIG. 7 is a simplified block diagram of a computing device with which embodiments of the present invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating example physical components of a computing device 700 with which embodiments of the invention may be practiced. The computing device components described below may be suitable for the computing devices described above and the server and data systems. In a basic configuration, computing device 700 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include operating system 705, one or more programming modules 706, and may include a web browser application 720. Operating system 705, for example, may be suitable for controlling computing device 700's operation. In one embodiment, programming modules 706 may include a graphical rendering, animation and display application or compositor application 160, as described above with reference to FIG. 1A, installed on computing device 700. Furthermore, embodiments of the invention may be practiced in conjunction with a graphics library, other operating systems, or any other application program and is not limited to any particular application or system. This basic configuration is illustrated in FIG. 7 by those components within a dashed line 708.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710. Computing device 700 may also contain a communication connection 716 that may allow device 700 to communicate with other computing devices 718, such as over a network in a distributed computing environment, for example, an intranet or the Internet. Communication connection 716 is one example of communication media.

As stated above, a number of program modules and data files may be stored in system memory 704, including operating system 705. While executing on processing unit 702, programming modules 706, such as the graphical rendering, animation, and display application 160 may perform processes including, for example, one or more method 600's stages as described above. The aforementioned process is an example, and processing unit 702 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the application 160 may be operated via application-specific logic integrated with other components of the computing device/system 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 712 such as a keyboard, a mouse, a pen, a sound input device, a touch input device, etc. Output device(s) 714 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
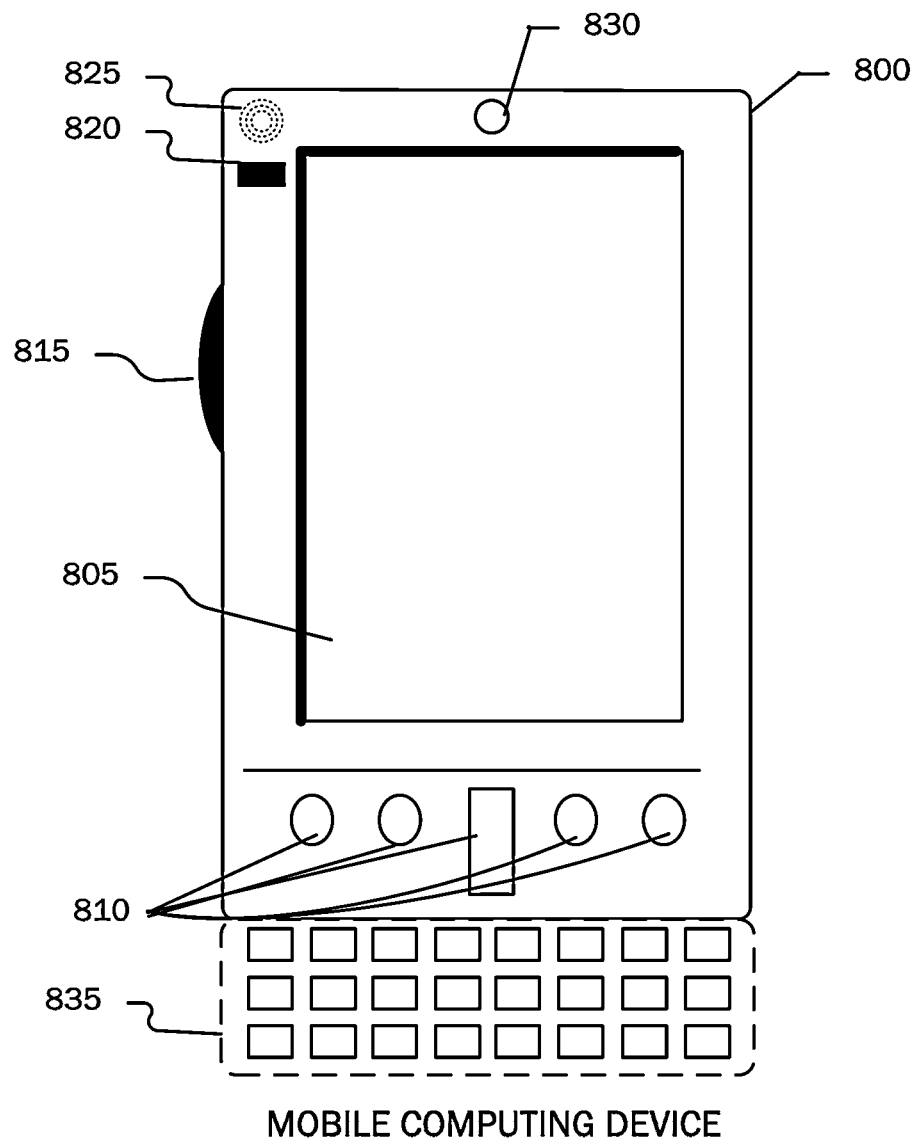
FIGS. 8A and 8B are simplified block diagrams of a mobile computing device with which embodiments of the present invention may be practices.
Figure 8B:
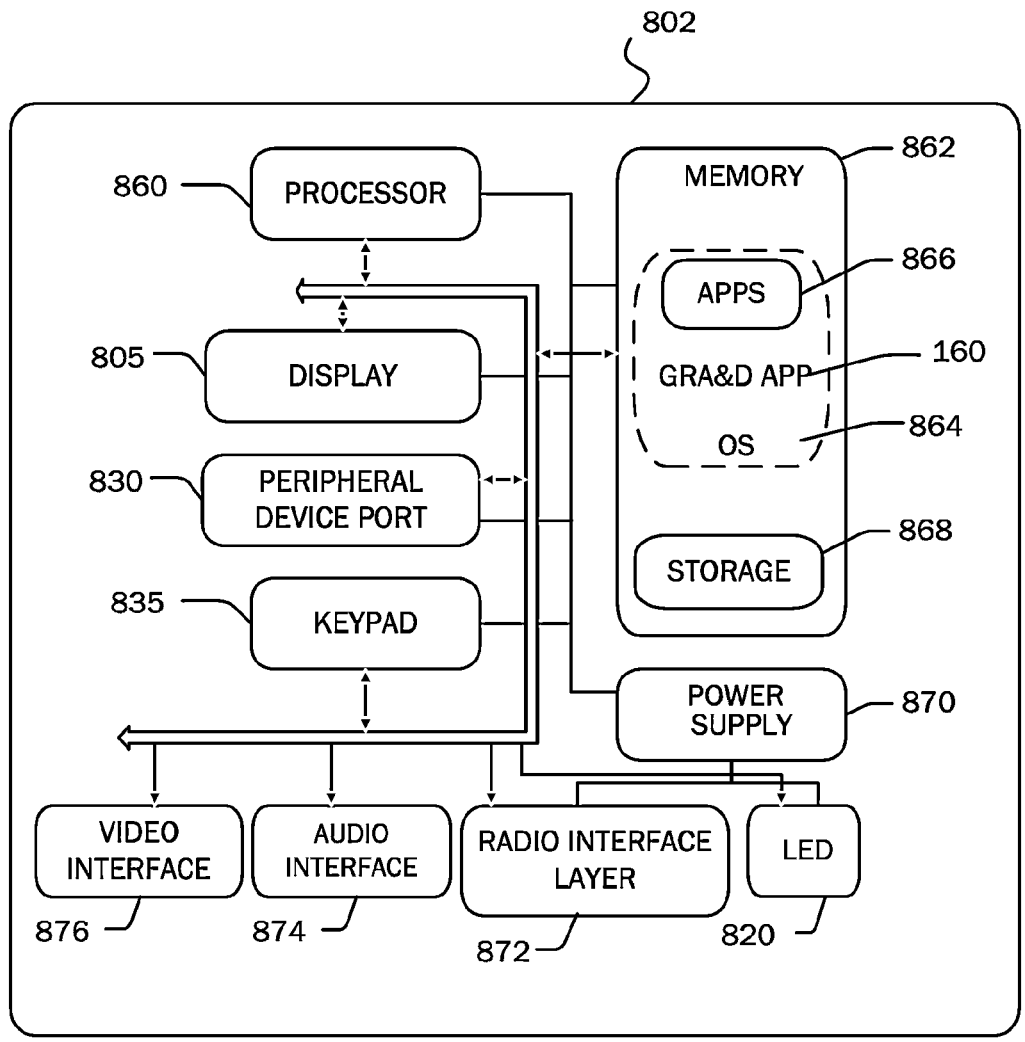
Figure 9:
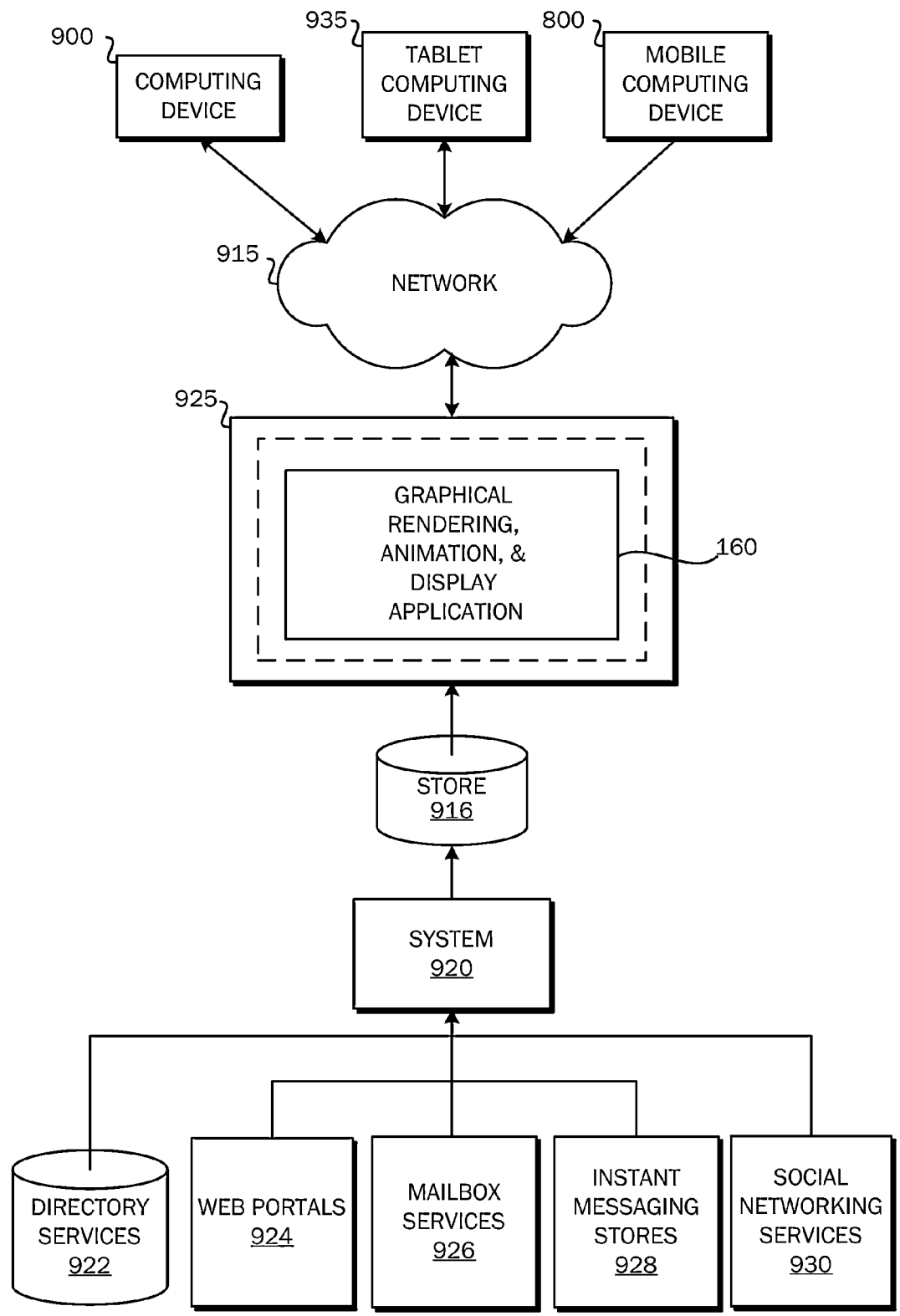
FIG. 9 is a simplified block diagram of a distributed computing system in which embodiments of the present invention may be practiced.

FIGS. 8A and 8B illustrate a suitable mobile computing environment, for example, a mobile telephone 800, a smartphone, a tablet personal computer, a laptop computer, and the like, with which embodiments of the invention may be practiced. With reference to FIG. 8A, an example mobile computing device 800 for implementing the embodiments is illustrated. In a basic configuration, mobile computing device 800 is a handheld computer having both input elements and output elements. Input elements may include touch screen display 805 and input buttons 810 that allow the user to enter information into mobile computing device 800. Mobile computing device 800 may also incorporate an optional side input element 815 allowing further user input. Optional side input element 815 may be a rotary switch, a button, or any other type of manual input element. In alternative embodiments, mobile computing device 800 may incorporate more or less input elements. For example, display 805 may not be a touch screen in some embodiments. In yet another alternative embodiment, the mobile computing device is a portable phone system, such as a cellular phone having display 805 and input buttons 810. Mobile computing device 800 may also include an optional keypad 835. Optional keypad 835 may be a physical keypad or a "soft" keypad generated on the touch screen display.

Mobile computing device 800 incorporates output elements, such as display 805, which can display a graphical user interface (GUI). Other output elements include speaker 825 and LED light 820. Additionally, mobile computing device 800 may incorporate a vibration module (not shown), which causes mobile computing device 800 to vibrate to notify the user of an event. In yet another embodiment, mobile computing device 800 may incorporate a headphone jack (not shown) for providing another means of providing output signals.

Although described herein in combination with mobile computing device 800, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 8B is a block diagram illustrating components of a mobile computing device used in one embodiment, such as the computing device shown in FIG. 8A. That is, mobile computing device 800 can incorporate system 802 to implement some embodiments. For example, system 802 can be used in implementing a "smart phone" that can run one or more applications similar to those of a desktop or notebook computer such as, for example, browser, e-mail, scheduling, instant messaging, and media player applications. In some embodiments, system 802 is integrated as a computing device, such as an integrated personal digital assistant (PDA) and wireless phone.

One or more application programs 866 may be loaded into memory 862 and run on or in association with operating system 864. Examples of application programs include phone dialer programs, e-mail programs, PIM (personal information management) programs, word processing programs, spreadsheet programs, Internet browser programs, messaging programs, and so forth. System 802 also includes non-volatile storage 868 within memory 862. Non-volatile storage 868 may be used to store persistent information that should not be lost if system 802 is powered down. Applications 866 may use and store information in non-volatile storage 868, such as e-mail or other messages used by an e-mail application, and the like. A synchronization application (not shown) also resides on system 802 and is programmed to interact with a corresponding synchronization application resident on a host computer to keep the information stored in non-volatile storage 868 synchronized with corresponding information stored at the host computer. As should be appreciated, other applications may be loaded into memory 862 and run on the device 800, including the graphical rendering, animation and display application or compositor application 160, described above with reference to FIG. 1A.

System 802 has a power supply 870, which may be implemented as one or more batteries. Power supply 870 might further include an external power source, such as an AC adapter or a powered docking cradle that supplements or recharges the batteries.

System 802 may also include a radio 872 that performs the function of transmitting and receiving radio frequency communications. Radio 872 facilitates wireless connectivity between system 802 and the "outside world", via a communications carrier or service provider. Transmissions to and from radio 872 are conducted under control of OS 864. In other words, communications received by radio 872 may be disseminated to application programs 866 via OS 864, and vice versa.

Radio 872 allows system 802 to communicate with other computing devices, such as over a network. Radio 872 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 802 is shown with two types of notification output devices; LED 820 that can be used to provide visual notifications and an audio interface 874 that can be used with speaker 825 to provide audio notifications. These devices may be directly coupled to power supply 870 so that when activated, they remain on for a duration dictated by the notification mechanism even though processor 860 and other components might shut down for conserving battery power. LED 820 may be programmed to remain on indefinitely until the user takes action to indicate the powered-on status of the device. Audio interface 874 is used to provide audible signals to and receive audible signals from the user. For example, in addition to being coupled to speaker 825, audio interface 874 may also be coupled to a microphone to receive audible input, such as to facilitate a telephone conversation. In accordance with embodiments of the present invention, the microphone may also serve as an audio sensor to facilitate control of notifications, as will be described below. System 802 may further include video interface 876 that enables an operation of on-board camera 830 to record still images, video stream, and the like.

A mobile computing device implementing system 802 may have additional features or functionality. For example, the device may also include additional data storage devices (removable and/or non-removable) such as, magnetic disks, optical disks, or tape. Such additional storage is illustrated in FIG. 8B by storage 868. Computer storage media may include volatile and nonvolatile, removable and non-removable media implemented in any method or technology for storage of information, such as computer readable instructions, data structures, program modules, or other data.

Data/information generated or captured by the device 800 and stored via the system 802 may be stored locally on the device 800, as described above, or the data may be stored on any number of storage media that may be accessed by the device via the radio 872 or via a wired connection between the device 800 and a separate computing device associated with the device 800, for example, a server computer in a distributed computing network such as the Internet. As should be appreciated such data/information may be accessed via the device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates a system architecture for providing communications and content associated with a graphical rendering, animation and display application 160 or compositor application to various client devices via a distributed computing environment before during or after a work session, as described above. As described previously, a graphical rendering, animation and display application or compositor application 160 allows for management of computer-generated display components, including discarding idle display components for memory and processing resources conservation. Display components managed via the application 160 may be stored in different communication channels or other storage types. For example, display components along with information from which they are developed may be stored using directory services 922, web portals 924, mailbox services 926, instant messaging stores 928 and social networking sites 930. The systems/applications 160, 920 may use any of these types of systems or the like for enabling management and storage of display components in a store 916. A server 925 may provide communications for managed display components and content to clients. As one example, server 925 may be a web server providing collaborative display component management communications and content over the web. Server 920 may provide online display component management and content over the web to clients through a network 915. Examples of clients that may obtain display component management communications and content include computing device 900, which may include any general purpose personal computer, a tablet computing device 935 and/or mobile computing device 800 which may include smart phones. Any of these devices may obtain display component management communications and content from the store 916.

Embodiments of the present invention are described above with reference to block diagrams and/or operational illustrations of methods, systems, and computer program products according to embodiments of the invention. The functions/ acts noted in the blocks may occur out of the order as shown in any flowchart. For example, two blocks shown in succession may in fact be executed substantially concurrently or the blocks may sometimes be executed in the reverse order, depending upon the functionality/acts involved.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-implemented method of conserving computer processing resources associated with displayed content, comprising:
generating and rendering a display component to a computer-generated display frame in association with a first software application;
tracking activity associated with the display component rendered to the display frame by tracking activity directed to the display frame containing the display component;
if the display frame is idle for a prescribed duration, maintaining a display of the display component on the display frame, and terminating any additional rendering processing of the display frame; and
managing the display component by a non-graphical resource component where discarding the non-graphical resource component causes a discarding from a memory space data representing the display component and causes a termination of any updating processing for the display component, wherein discarding the non-graphical resource component is overridden until a request to discard the non-graphical resource component is received.

2. The method of claim 1, wherein terminating any additional rendering processing of the display frame includes terminating any updating of the rendered display component after an elapse of the prescribed duration such that the display of the display component on the display frame is not updated after the prescribed duration.

3. The method of claim 1, wherein terminating any additional rendering processing of the display frame includes terminating any display animation processing associated with the rendered display component after an elapse of the prescribed duration such that any animation associated with the display component on the display frame is terminated after the prescribed duration.

4. The method of claim 1, further comprising:
receiving an indication of an activity associated with the display component after the display component becomes idle for the prescribed duration;
generating an updated display component; and
rendering the updated display component to the display frame.

5. The method of claim 4, wherein receiving the indication of the activity associated with the display component after the display frame becomes idle for the prescribed duration includes receiving an indication of a user action on the display component after the display frame becomes idle for the prescribed duration.

6. The method of claim 4, wherein receiving the indication of the activity associated with the display component after the display component becomes idle for the prescribed duration includes receiving an indication of a system action on the display component after the display component becomes idle for the prescribed duration.

7. The method of claim 1, wherein tracking activity directed to the display frame containing the display component rendered to the display frame includes timing user or system activity associated with the display component to determine a duration after a last user or system activity on the display component in which no user or system activity is received for the display component, and comparing the duration after the last user or system activity on the display component in which no user or system activity is received for the display component with the prescribed duration.

8. The method of claim 1, wherein terminating any additional rendering processing of the display frame includes terminating any additional rendering processing of the display component by a software application to which the display component is associated, and wherein discarding from the memory space data representing the display component includes discarding data representing the display component from a memory space allocated for the first software application to which the display component is associated.

9. The method of claim 8, wherein prior to terminating any additional rendering processing for the display component and discarding from the memory space data representing the display component, further comprising passing the display component to a second software application for maintenance of the display component by the second software application during a period after the prescribed duration has elapsed.

10. The method of claim 9, wherein after passing the display component to the second software application for maintenance of the display component by the second software application during the period after the prescribed duration has elapsed further comprising storing data representing the display component to memory allocated to the second software application during the period after the prescribed duration has elapsed.

11. The method of claim 10, further comprising:
receiving an indication of an activity associated with the display frame after the display frame becomes idle for the prescribed duration;
reclaiming the display component of the display frame from the second software application; and
rendering the reclaimed display component to the display frame in association with the first software application.

12. The method of claim 9, wherein passing the display component to the second software application for maintenance of the display component by the second software application during the period after the prescribed duration has elapsed includes passing the display component to an operating system associated with the first software application.

13. The method of claim 1, further comprising associating a layer host component with the generated and rendered display component for tracking user or system activity associated with the display component.

14. The method of claim 13, wherein associating the layer host component with the generated and rendered display component for tracking user or system activity associated with the display component includes associating the layer host component with a display frame provided by the first software application wherein the display component is displayed in the display frame and wherein the layer host component tracks user or system activity directed to the associated display frame.

15. The method of claim 14, further comprising storing the display component with a display component atlas along with one or more other display components utilized by one or more software applications and mapping the stored display component from the layer host component to the display component atlas.

16. A computer-implemented method of conserving computer processing resources associated with displayed content, comprising:
generating and rendering a display component to a computer-generated display frame in association with a first software application;
tracking activity associated with the display component rendered to the display frame by tracking activity directed to the display frame containing the display component; and
if the display frame is idle for a prescribed duration, maintaining a display of the display component on the display frame, terminating any additional rendering processing of the display frame, and discarding from a memory space data representing the display component,
wherein the display component maintains a reference count for a number of layer hosts associated with the display component such that when a given layer host associated with the display component is active, incrementing the reference count for the display component, and wherein when the given layer host associated with the display component is idle for the prescribed duration, decrementing the reference count for the display component.

17. The method of claim 16, wherein if the reference count for the display component is decremented to zero, discarding data representing the display component and any updating processing for the display component.

18. The method of claim 16, wherein if all display components contained in a display component atlas have reference counts of zero, discarding all display components contained in the display component atlas and discarding all display components contained in the display component atlas and discarding the display component atlas.

19. The method of claim 18, wherein if data representing the display component is discarded from the display component atlas, compacting the display component atlas such that any remaining display components contained in the display component atlas are moved to a second display component atlas so that the display component atlas from which the any remaining display components are moved may be discarded.

20. The method of claim 18, wherein if two display component atlases require a total memory space allocation equal to or less than required by a single display component atlas, moving any display components contained in one of the two display component atlases into the other of the two display component atlases such that one of the two display component atlases is empty and may be discarded. display component atlas.

21. The method of claim 16, wherein terminating any additional rendering processing of the display frame includes terminating any updating of the rendered display component after an elapse of the prescribed duration such that the display of the display component on the display frame is not updated after the prescribed duration.

22. The method of claim 16, wherein terminating any additional rendering processing of the display frame includes terminating any display animation processing associated with the rendered display component after an elapse of the prescribed duration such that any animation associated with the display component on the display frame is terminated after the prescribed duration.

23. A system for conserving computer processing resources associated with displayed content, comprising:
a processing unit; and a memory including executable instructions which, when executed by the processing unit, provides a display compositor application operative
  to generate and render a display component to a computer-generated display frame in association with a first software application;
a layer host operative
  to manage a display frame provided by the first software application wherein the display component is displayed in the display frame and wherein the layer host is operative to track user or system activity associated with the display frame;
  to map the display component to a display component atlas for storing the display component at the display component atlas along with one or more other display components utilized by one or more software applications;
the display component atlas being operative
  to discard data representing any display component contained in the display component atlas having a reference count of zero; and
  to move any remaining display components contained in the display component atlas to another display component atlas so that the display component atlas from which the any remaining display components are moved may be discarded.

* * * * *